(12) United States Patent
Beigelman

(10) Patent No.: US 8,281,409 B2
(45) Date of Patent: Oct. 2, 2012

(54) SYSTEMS AND METHODS FOR SECURELY PROVIDING EMAIL

(75) Inventor: Alex Beigelman, Merrick, NY (US)

(73) Assignee: UBS AG, Zurich (CH)

( * ) Notice: Subject to any disclaimer, the term of this patent is extended or adjusted under 35 U.S.C. 154(b) by 317 days.

(21) Appl. No.: 12/639,659

(22) Filed: Dec. 16, 2009

(65) Prior Publication Data

US 2010/0161961 A1 Jun. 24, 2010

Related U.S. Application Data

(60) Provisional application No. 61/140,260, filed on Dec. 23, 2008.

(51) Int. Cl.
*H04L 29/06* (2006.01)
*G06F 7/04* (2006.01)
*G06F 17/30* (2006.01)
*G06F 15/16* (2006.01)

(52) U.S. Cl. .................. 726/26; 713/152; 709/206

(58) Field of Classification Search .................. 713/152; 726/26; 709/206
See application file for complete search history.

(56) References Cited

U.S. PATENT DOCUMENTS

| | | | |
|---|---|---|---|
| 6,721,784 B1 * | 4/2004 | Leonard et al. | 709/206 |
| 7,246,378 B1 * | 7/2007 | Marvit et al. | 726/29 |
| 7,334,267 B2 | 2/2008 | Engstrom | |
| 2002/0007453 A1 | 1/2002 | Nemovicher | |
| 2002/0120869 A1 | 8/2002 | Engstrom | |
| 2002/0178353 A1 * | 11/2002 | Graham | 713/151 |
| 2002/0194470 A1 * | 12/2002 | Grupe | 713/153 |
| 2004/0151323 A1 | 8/2004 | Olkin et al. | |
| 2005/0210246 A1 | 9/2005 | Faure | |
| 2008/0046579 A1 | 2/2008 | Walton | |
| 2009/0070866 A1 | 3/2009 | Erikson | |

FOREIGN PATENT DOCUMENTS

| | | |
|---|---|---|
| WO | WO 00/49786 | 8/2000 |
| WO | WO 02/093849 A2 | 11/2002 |

OTHER PUBLICATIONS

Menezes, Alfred J. et al. Handbook of Applied Cryptography, 1997 CRC Press, LLC, pp. 31-32.*
WinZip. "WinZip Self-Extractor", retrieved Jan. 2005.*
Resnick P: "*Request for Comments 2822: Internet Message Format*"; Network Working Group Request for Comments, XX, XX, Apr. 1, 2001, pp. 1-51, XP 002270213; ¶ [3.6.4].
International Search Report for corresponding EP 09 01 5889, completed Mar. 31, 2010.

* cited by examiner

*Primary Examiner* — Michael Simitoski

(57) ABSTRACT

Systems and methods for securely providing email messages are provided. A workstation computer is provided that includes a memory for storing computer executable instructions and a processor for accessing the memory and for executing the computer executable instructions. The computer executable instructions includes an email client configured to process email messages, at least one email message having an executable decryption attachment that includes encrypted embedded content that can only be decrypted with a unique cryptography key. The executable decryption attachment, when executed, is configured to establish a secure connection with an encryption server, receive the unique cryptography key from the encryption server and decrypt the embedded content.

11 Claims, 6 Drawing Sheets

SYSTEMS AND METHODS FOR SECURELY PROVIDING EMAIL

RELATED APPLICATIONS

The present invention claims priority from U.S. Provisional Patent Application No. 61/140,260, filed on Dec. 23, 2008, which is herein incorporated by reference.

TECHNICAL FIELD

The present invention relates to email messages, and more particularly systems and methods for securely providing email messages.

BACKGROUND

Electronic mail ("email") is a system and method for exchanging digital messages. Email systems employ a store-and-forward model in which email computer server systems accept, forward, deliver and store messages on behalf of users that connect to an email server, with a network-enabled device (e.g., a personal computer, a personal digital assistance (PDA), or the like) for the duration of message submission or retrieval. An email message consists of two components, the message header, and the message body, which is the email message's content. The message header contains control information, including an originator's email address and the email address of one or more recipients. Additional information can also be added to the header field, such as a subject of the email message. The body of the email can include a text message. The text can include encoded characters (e.g., hypertext) that can alter the formatting of the message as displayed to the user. Additionally, one or more files can be encoded into the body of the email message, which can be referred to as an attachment. By default, the body of an email message is unencrypted and transferred over an unsecured network, such as the Internet. Thus, an unauthorized user (e.g., a hacker) can intercept and access the email message.

Computer cryptography systems allow information to be encrypted and/or decrypted. As one example, information can be encrypted and decrypted with a symmetric cryptography key. In another example, information can be exchanged via a public/private key infrastructure (PKI). A PKI is an asymmetric (e.g., "one-way") encryption scheme, wherein data encrypted by a public key can only be decrypted by a corresponding private key. In a PKI, a given entity's public key is freely distributed, while the private key is known only to the given entity. Information can be securely provided to the given entity by another entity when the another entity employs the public key of the given entity to encrypt information, and that information can only be decrypted with the private key of the given entity. In still another example, information can be exchanged via a double private key infrastructure. A double private key infrastructure is an asymmetric key structure wherein each first private key has a corresponding second private key, wherein information encrypted with the first private key can only be decrypted with the second private key, and vise-versa. However, in contrast to the PKI, in a double private key infrastructure, neither the first nor the second private key is freely distributed.

SUMMARY

One aspect of the invention provides a system for securely providing email messages. A workstation computer is provided comprising a memory for storing computer executable instructions and a processor for accessing the memory and for executing the computer executable instructions. The computer executable instructions comprise an email client configured to process email messages, at least one email message having an executable decryption attachment that includes encrypted embedded content that can only be decrypted with a unique cryptography key. The executable decryption attachment, when executed, is configured to establish a secure connection with an encryption server, receive the unique cryptography key from the encryption server and decrypt the embedded content.

Another aspect of the invention provides a computer readable medium having computer executable instructions for performing a method for securely providing email messages, the method comprising stripping at least a portion of the contents of an email message marked for encryption. The stripped contents are encrypted to form encrypted contents that can only be decrypted with a unique cryptography key. An executable file is generated that includes the encrypted contents and a unique message identification. The stripped contents of the email message are replaced with the executable file. Upon execution of the executable file by a recipient of the email message, the recipient of the email message is authenticated and the unique cryptography key is provided to the recipient.

Yet another aspect of the invention is related to a methodology for securely providing email, the method comprising receiving an email message that includes an executable file with encrypted content that can be only decrypted with a unique cryptography key. The executable file, when executed, prompts a recipient of the email message for a password and receives the unique cryptography key over a network. The executable file also decrypts the encrypted content with the unique cryptography key.

DETAILED DESCRIPTION

Figure 1:
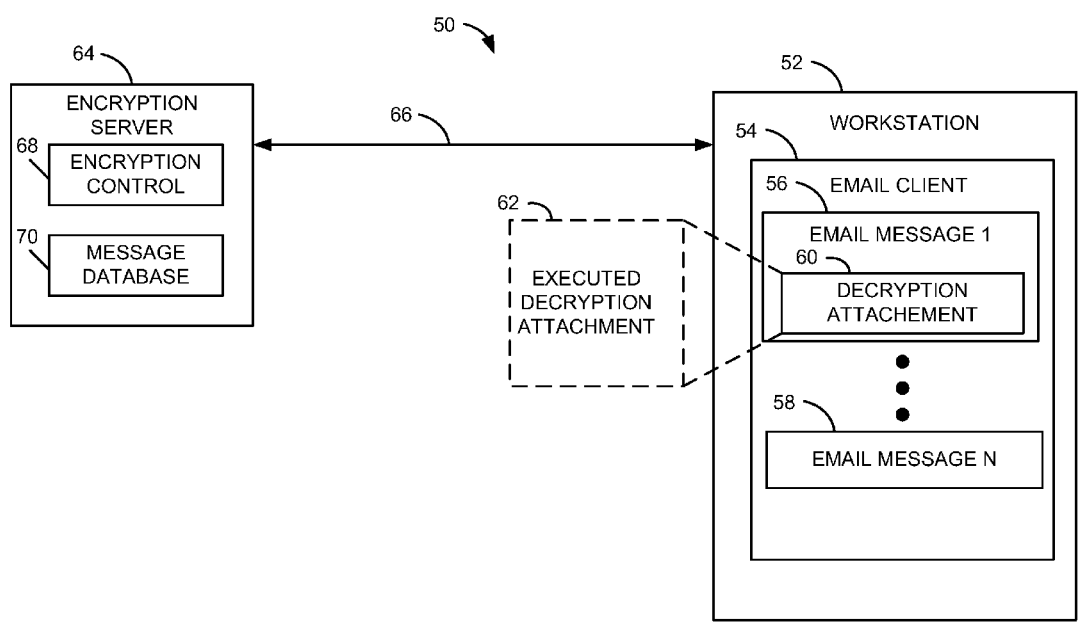
FIG. 1 illustrates a system for securely transferring an email message in accordance with an aspect of the invention.

FIG. 1 illustrates an example of a system 50 for providing a secure (e.g., confidential) email, in accordance with an aspect of the invention. The system 50 includes a workstation 52. The workstation 52 can be implemented, for example, as a computer, such as a desktop computer, a laptop computer, a personal digital assistant (PDA), or the like. The workstation 52 can include an email client 54 that processes email messages. The email client 54 can be implemented, for example, as a software application executing on the workstation 52, such as MICROSOFT OUTLOOK®. Alternatively, the email client 54 can be implemented as a virtual software application executing within an Internet Web browser, such as YAHOO MAIL® or GOOGLE MAIL®. The email client 54 can provide an interface (e.g., a graphical user interface) to an end user of the workstation 52 for accessing and generating email messages and files attached to the email messages, which can be referred to as an attachment.

The email client 54 provides access to N number of email messages 56 and 58, where N is an integer greater than or equal to one. At least one of the email messages 56 is a secure email message that includes a decryption attachment file 60 attached to the email message. The decryption attachment file 60 can be implemented as an executable file, such as JAVA® Archive ("JAR") file, a MICROSOFT®.NET file, etc. The user of the workstation 52 can access and execute the decryption attachment, as indicated at 62.

The decryption attachment file 60, upon execution (indicated at 62), can contact an encryption server 64 and establish a secure connection 66 over a network, such as the Internet. The encryption server 64 can be implemented as a computer, such as a WINDOWS® server, or a Linux server. The executed decryption attachment file 62 can be configured to create the secure connection 66 by employing any known encryption scheme, such as a public/private key exchange, employment of a symmetric secret key, the employment of multiple private keys, etc. Upon establishment of the secure connection 66, the executed decryption attachment file 62 can provide a unique message identification ("message ID") to the encryption server 64 that identifies the email message 56 to which the decryption attachment file 60 is attached. An encryption controller 68 of the encryption server 64 can search a message database 70 for a record corresponding to the message identification. If a match is found, the encryption controller 68 can signal the executed decryption attachment file 62 to prompt the user of the workstation 52 for information, such as a password. Additionally, in some implementations, the user of the workstation 52 can also be prompted for a username. The user of the workstation 52 can enter the information requested, which can then be sent securely to the encryption server 64.

Upon receiving the information requested, the encryption controller 68 can examine the received information to determine if the received information matches information in the record of the message database 70 associated with the email message 56, which can be referred to as record information. If the received information and the record information do not match, the encryption server 64 can signal the executed decryption attachment file 62 to re-prompt the user for the requested information, which can be re-checked against the record information. This process can be repeated a limited number of times (e.g., three times). If the limited number of times is exceeded, and there is still no match between the received information and the record information, the encryption server 64 can signal the executed decryption attachment file 62 to indicate to the user of the workstation 52 that no further attempts can be made, and access to contents (e.g., data) encrypted and encoded within the decryption attachment file 60 is denied.

If the received information matches the record information, thereby authenticating the user of the workstation 52, the encryption server 64 can provide a cryptography key to the executed decryption attachment file 62 via the secure connection 66. It is to be understood that the term "cryptography key," "encryption key" and "decryption key" can be used interchangeably, since it is to be understood that in certain circumstances, a cryptography key can be used for both encryption and decryption. Upon reception of the cryptography key, the executed decryption attachment file 62 can employ the cryptography key to decrypt contents encoded and encrypted in the decryption attachment file 60. As an example, the content encrypted and encoded in the decryption attachment file 60 can be one or more binary files, such as documents, spreadsheets, etc. Additionally or alternatively, the content encoded in the decryption attachment file 60 can include one or more text messages. Upon decryption of the files and/or the text messages, the executed decryption attachment file 62 can provide a user interface that allows the user of the workstation 52 to access the decrypted content.

Additionally, the interface of the executed decryption attachment file 62 can provide the user of the workstation 52 with the ability to encrypt one or more files and/or one or more text messages. In such a situation, the executed decryption attachment file 62 can employ the same cryptography key used for decryption to encrypt the files and/or the text messages, and the encrypted information can be encoded into the decryption attachment file 60, which can then be attached to a reply message of the email client 54, such that the executed decryption attachment file 62 operates as a secure envelope. It is to be understood that other implementations are possible as well. As one example, the executed decryption attachment file 62 can be configured to generate a new file with the encrypted content.

The system 50 illustrated in FIG. 1 allows secure email to be transferred without the need for proprietary software, such as a plug-in for the email client 54. Additionally, the system 50 can be configured such that a cryptography key associated with an email is unique for each email message in the message database 70. Accordingly, even if the cryptography key were cracked (e.g., accessed without authorization), only the content encoded in the decryption attachment file 60 could be decrypted.

Figure 2:
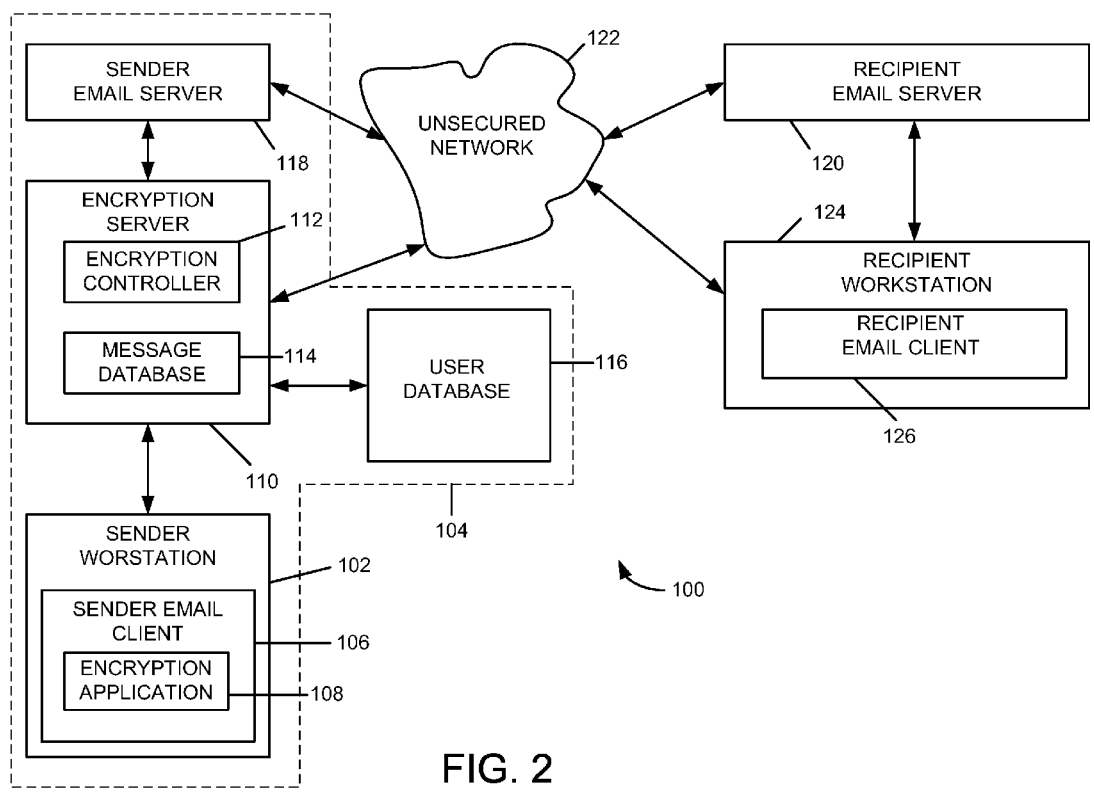
FIG. 2 illustrates another example of a system for securely transferring an email message in accordance with an aspect of the invention.

FIG. 2 illustrates another example of a system 100 for providing secure email messages in accordance with an aspect of the invention. The system 100 includes a sender workstation 102 that can be implemented, for example as a computer, such as a desktop computer, a laptop computer, a PDA, or the like. The sender workstation 102 can be a node of a private network 104. The private network 104 can be configured so that secure communications between nodes of the private network 104 can commence. The private network 104 can be implemented, for example, as a virtual private network (VPN) within a public and unsecure network (e.g., the Internet). Alternatively, the private network 104 can be implemented as a network behind a firewall. It is to be understood that other implementations of the private network 104 are also possible.

The sender workstation 102 can include an email client 106 executing on the sender workstation 102, which can be referred to as a sender email client 106. The sender email client 106 can be implemented as a software application executing on the sender workstation 102, such as MICROSOFT OUTLOOK®, NOVELL GROUPWISE®, etc. The sender email client 106 can allow a user of the sender workstation 102, who can be referred to as a sender, to generate and receive email messages. For example, a sender can employ the sender email client 106 to create a new email message addressed to a recipient. In such a situation, the new email message can include, for example, the email address of the recipient, a subject of the email, text (e.g., the body of the email) and one or more files attached to the email message.

The sender email client 106 can include an encryption application 108 being executed as an applet or plug-in of the sender email client 106. The encryption application 108 can provide the sender with the ability to mark a generated email as "secure" (e.g., confidential) to indicate that the email message should be transferred securely to the recipient. As one example, the sender email client 106 (via the encryption application 108) can provide an interface tool (e.g., a virtual button) that marks the generated email as secure. Upon detection of an email message being marked as secure being sent, the encryption application 108 can provide the message to an encryption server 110 of the private network 104, along with an indication that the email is marked as secure. In other implementations, an encryption controller 112 of the encryption server 110 can be configured to detect (e.g., intercept) messages entering and exiting the private network 104 that are marked as secure.

In response to receipt and/or detection of the email message, the encryption controller 112 can generate one more unique cryptography keys for the email message. In one example, the encryption controller 112 can generate a secret symmetric key for the email message. In another example, the encryption server 110 can generate two private keys for the email message; while in yet another example, the encryption controller 112 can be configured to generate two public/private key pairs for the email message. One of ordinary skill in the art will understand and appreciate that other encryption methods can be employed as well. For purposes of simplification of explanation, it will be assumed that the encryption server 110 is configured to employ a double private encryption scheme, such that a first private key and a second private key are generated for the email message, wherein data encrypted by the first private key can only be decrypted with the second private key, and vise-versa.

The generated first and second private keys, as well as the generated message ID are stored in a record of a message database 114. Although the message database 114 is illustrated in FIG. 2 as being within the encryption server 110, one of ordinary skill will understand and appreciate that the message database 114 could be implemented on a system external to the encryption server, such as a database server. Additionally, the encryption controller 112 can be configured to query a user database 116 for information of a user corresponding to the recipient of the email message. The user database 116 can be implemented, for example, on separate node (e.g., a database server) of the private network 104. Moreover, although FIG. 2 illustrates the user database 116 as being external to the encryption server 110, one of ordinary skill in the art will understand and appreciate that the user database 116 could be implemented within the encryption server 110. If a match to the recipient is found in the user database 116, the user database 116 can provide the encryption server 110 with a password for the recipient. Additionally, the user database 116 can also provide the encryption server 110 with a username for the recipient. The information provided from the user database 116 to the encryption server 110 can be referred to as user information.

Upon receipt of the user information, the encryption controller 112 can store the user information in the record of the message database 114 associated with the email message. The encryption controller 112 of the encryption server 110 can be configured to strip (e.g., remove) the attached files from the email message. Additionally or alternatively, the encryption controller 112 can strip (e.g., remove) at least a portion of the body (e.g., text) from the email message. The stripped files and body can be referred to as stripped contents. The stripped content can be encrypted with the first generated private key associated with the email message. As one example, an encryptor class of a JAR file can be employed to implement the encryption. The stripped content, upon encryption can be referred to as encrypted content. The encryption controller 112 can encode the encrypted content into an executable file, such as a JAR file, a MICROSOFT.NET® file, or the like. Additionally, the message ID can also be encoded into the executable file.

The executable file generated by the encryption controller 112 can be attached back to the email message as a file attachment. The attached executable file can be referred to as a decryption attachment. Additionally, the encryption controller 112 can also add text to the email message that provides instructions for accessing the encoded and encrypted content. The email message along with the decryption attachment can be provided to a sender email server 118, such as a post office protocol version 3 (POP3) server, a MICROSOFT EXCHANGE® server, or the like. Although the sender email server 118 is being illustrated in FIG. 2 as being operated on a node of the private network 104 separate from the encryption server 110, one of ordinary skill will understand and appreciate that the sender email sever 118 and the encryption server 110 can also be implemented on the same computer system. Alternatively, the email message could also be provided back to the sender workstation 102. In such a situation, upon receipt of the email message, the sender workstation 102 could be configured to provide the email message to the sender email server 118.

The sender email server 118 can be configured as a standard email server, such that no special configuration is needed to accommodate the email message with the decryption attachment. The sender email server 118 forwards the email message with the decryption attachment to a recipient email server 120 associated with the recipient of the email message over an unsecured network 122, such as the Internet.

The system 100 also includes a recipient workstation 124. The recipient workstation 124 can be implemented as a computer, such as a desktop computer, a laptop computer, a PDA, etc. The recipient workstation 124 can be operated, for example, by a recipient of the email message, who can be referred to as the recipient. An email client 126 can operate on the recipient workstation 124, which can be referred to as a recipient email client 126. The recipient email client 126 can be an application executing on the workstation, such as MICROSOFT OUTLOOK®, NOVELL GROUPWISE®, etc. Alternatively, the recipient email client 126 can be implemented as a virtual application executing within a web browser of the recipient workstation 124, such as YAHOO MAIL®, GOOGLE MAIL®, etc. The recipient email client 126 can be configured to periodically (or asynchronously) contact the recipient email server 120 to check for new email messages addressed to the recipient stored at the recipient email server 120. In some implementations, the email client 126 can be configured to contact the recipient email server 120 via the unsecured network 122. In other implementations, the email client 126 can be configured to contact the recipient email server via a local network connection (e.g., a connection in a second private network). In the present example, one such new email message addressed to the recipient includes the email message with the decryption attachment. The recipient email client 126 can be configured to download the new messages, including the email message with the decryption attachment.

The recipient email client 126 can provide a user interface that allows the recipient to process email messages. In the present example, the recipient email client 126 can store email messages, including the email message with the decryption attachment. When the recipient desires to access the email message with the decryption attachment, the user can employ the recipient email client 126 to open the email message with the decryption attachment. Upon opening the email message with the decryption attachment, the recipient email client 126 can display text to the recipient. The text displayed to the user can include a text message from the sender of the email and/or the instructions for accessing the decrypted and encoded content of the email message. As one example, the instructions can include information that instructs the recipient to execute and possibly download the decryption attachment to local storage of the recipient workstation 124.

The decryption attachment can be executed, for example with a software interface of the recipient workstation 124. As one example, if the decryption attachment is implemented as a JAR file, the recipient workstation 124 can execute the decryption attachment via a JAVA virtual machine (JVM). Upon downloading and executing the decryption attachment, the decryption attachment can establish a secure connection with the encryption server 110 over the unsecured network 122. The secure connection can be established, for example by using public and private key pairs of the recipient workstation 124 and the encryption server 110. For instance, the decryption attachment and the encryption server 110 can establish a secure connection over a transport security layer (TLS) or a secure socket layer (SSL). One of ordinary skill in the art will understand and appreciate the various structures and methods for establishing the secured connection. The decryption attachment can be configured to provide the message ID to the encryption controller 112 of the encryption server 110. In response, the encryption controller 112 can access the message database 114 and search for the record associated with the message ID.

Upon accessing the record that is associated with the message ID, the encryption controller 112 can signal the decryption attachment to prompt the recipient for the user information stored in the record. The recipient can enter the user information (e.g., a password and a username) at recipient workstation 124, and the decryption attachment can forward the entered user information to the encryption controller 112. The encryption controller 112 can compare the entered user information with the user information stored in the record associated with the message ID to determine if a match has been made. If no match has been made, encryption controller 112 can signal the decryption attachment to repeat the request for the user information. This process can be repeated a predetermined limited number of times (e.g., three times). If no match is found between the entered user information and the user information stored in the record associated with the message ID before the predetermined limited number of times is exceeded, the encryption controller 112 can signal the recipient email client 126 of the recipient workstation 124 to inform the recipient that no further attempts are possible, and that the encrypted and encoded content in the decryption attachment will not be decrypted.

If a match between the entered user information and the user information stored in the record associated with the message ID is found, the encryption controller 112 can be configured to forward the second private key of the private key pair stored in the record associated with the message ID. The decryption attachment can employ the second private key to decrypt the encrypted content that is encoded in the decryption attachment. Upon decryption of the encrypted content, an interface window can be displayed to the recipient. As one example, FIG. 3 illustrates a window 150 that could be displayed to the recipient upon decryption of the encrypted content.

Figure 3:
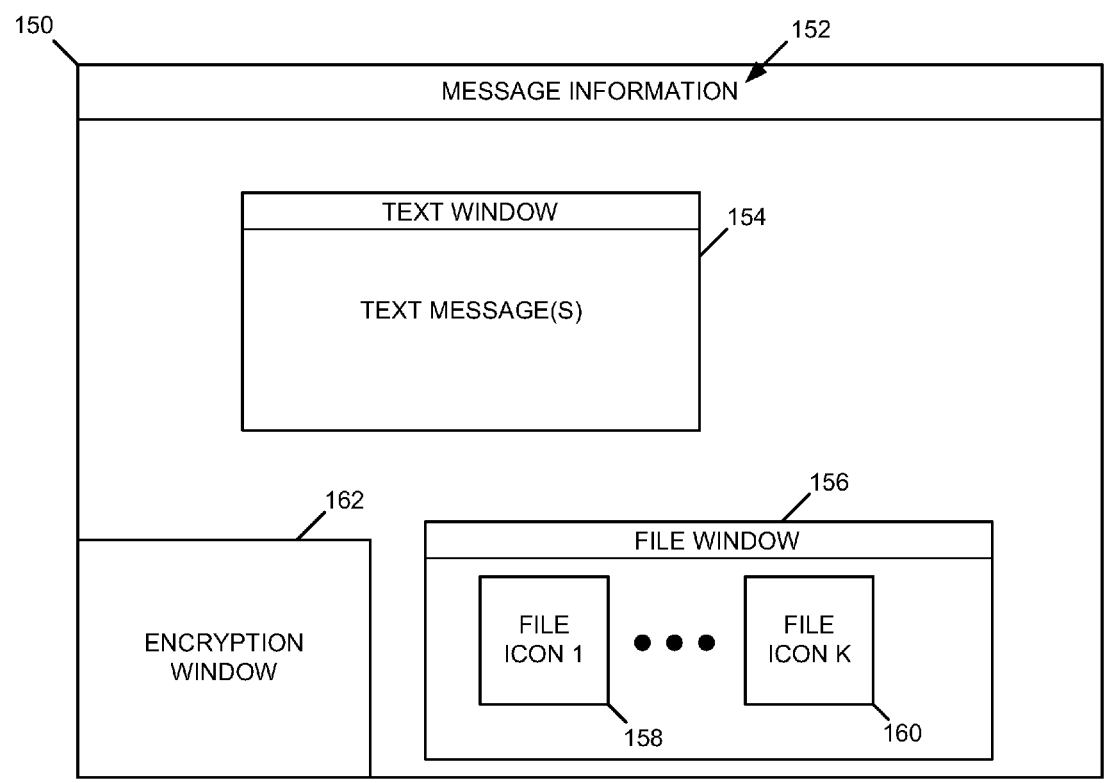
FIG. 3 illustrates an example of a user interface in accordance with an aspect of the invention.

FIG. 3 illustrates an example of a user interface that includes the interface window 150 in accordance with an aspect of the invention. Message information 152 can be displayed to the recipient in the interface window 150. The message information 152 can include, for example, the name of the sender, an email address of the sender, a subject of the email message, etc. Additionally, the interface window 150 can include a text window 154 that displays the one or more text messages of the encrypted content in decrypted form. Still further, a file window 156 can be included that displays K icons 158 and 160, wherein K is an integer greater than or equal to one. In the present example, each icon 158 and 160 corresponds to a decrypted file of the encrypted contents. As one example, the recipient can access the decrypted files by actuating the icons 158 and 160 (e.g., by "clicking" on the icons). Upon actuation of an icon 158 or 160, the corresponding decrypted file can be opened, for example by an associated program, such as word processor, a spreadsheet application, etc.

In some implementations, the decryption attachment can be configured such that the sender needs to provide the requested information each time that the encrypted content encoded into the decryption attachment is accessed. In other implementations, once decrypted, the decryption attachment can be configured to allow unlimited access to the decrypted content. In still another implementation, the decryption attachment can be configured to allow access to the decrypted content for a predefined period of time (e.g., one or more days) before the recipient would be required to re-enter the requested information.

Additionally, the decryption attachment can include an interface in the interface window 150 for encrypting data using the second private key. For instance, the interface window 150 can include an encryption window 162. The decryption attachment can be configured such that files and/or text messages "dragged and dropped" to the encryption window 162 are encrypted with the second private key and encoded into either the decryption attachment or a new file. For purposes of simplification of explanation, it will be assumed that the data encrypted by the decryption attachment is encoded into the decryption attachment.

Referring back to FIG. 2, should the recipient desire to reply to the email message with the decryption attachment, the recipient can draft one or more text messages and prepare one or more files for encryption, and "drag and drop" the text messages and/or the prepared files onto the encryption window 162 illustrated in FIG. 3. Subsequently, the recipient can prepare a reply email message for the sender and/or other users, and attach the decryption attachment to the reply email message. The reply email message can be sent to the sender in a manner similar to the method that the original email message was send to the recipient (e.g., as a standard email message).

The reply email message can be detected and/or intercepted by an encryption controller 112 of the encryption server 110 before or after the reply email is received by the email server. Upon detecting and/or intercepting the reply email, the reply email can checked for the presence of the decryption attachment. If the decryption attachment file is detected, the encryption controller 112 of the encryption server 110 can decrypt the data encrypted by the decryption attachment of the original email automatically by employing the first private key stored in the record associated with the message ID of the decryption attachment. In some implementations, the decryption attachment is not executed and is discarded to avoid the execution of unauthorized programs (e.g., Trojan Horses, computer viruses, etc.). The decrypted data, including text messages and files are inserted and/or attached to the reply email message body and sent to the sender email server 118, such that the sender receives the reply email in its decrypted form.

The system 100 thus provides a robust and secure process for providing secure information (e.g., confidential information) to and from the sender and the recipient over an unsecure network. Moreover, since the decryption attachment is an executable file attached to a standard email message, no modifications need to be made to the recipient email client 126 of the recipient workstation 124 or to the email servers. Further, the secure email can be sent without the employment of any specific recipient email client 126 at the recipient workstation 124, and no digital certificates are required to implement the system 100.

Figure 4:
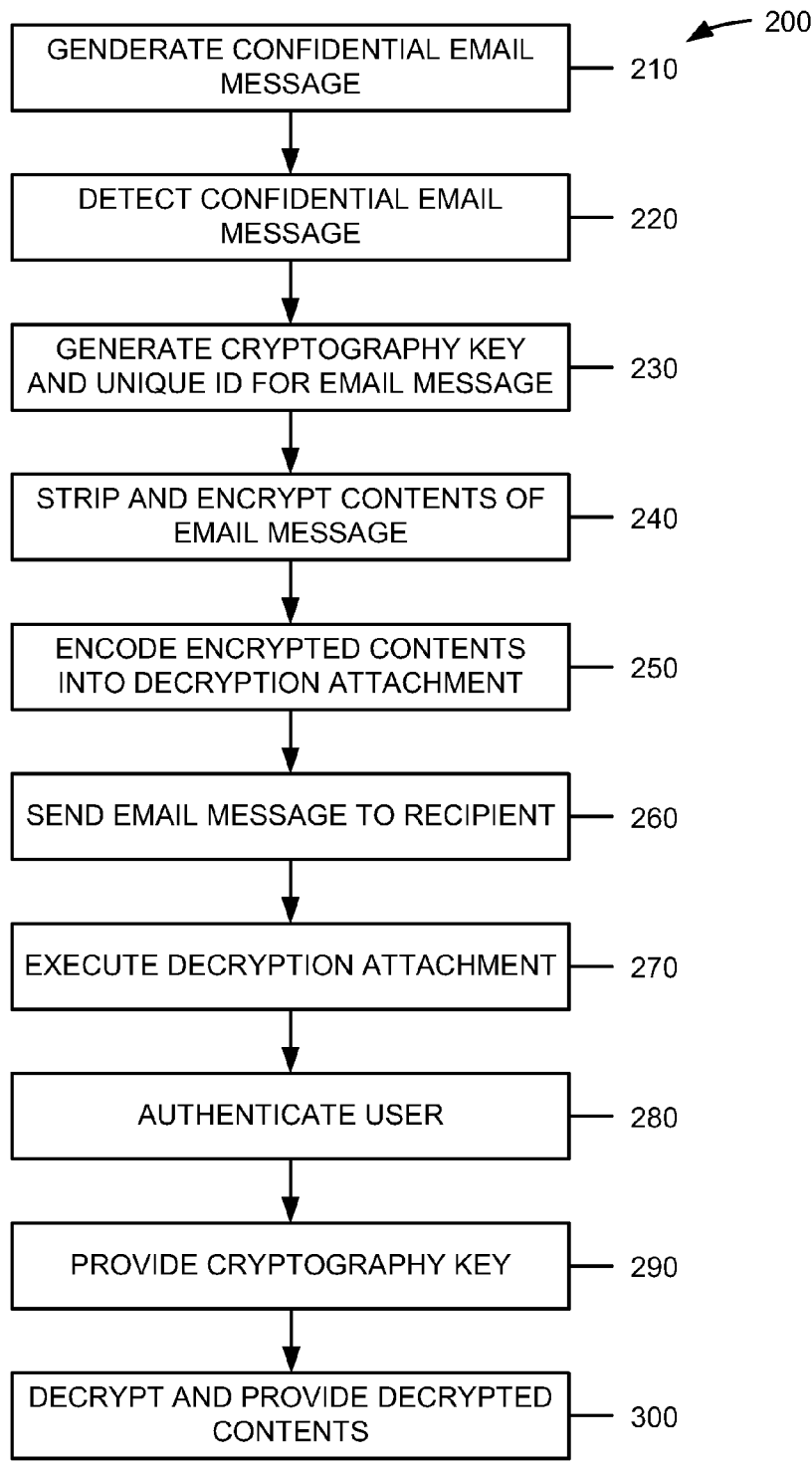
FIG. 4 illustrates an example of a flow chart of a methodology for securely transferring an email message in accordance with an aspect of the invention.
Figure 5:
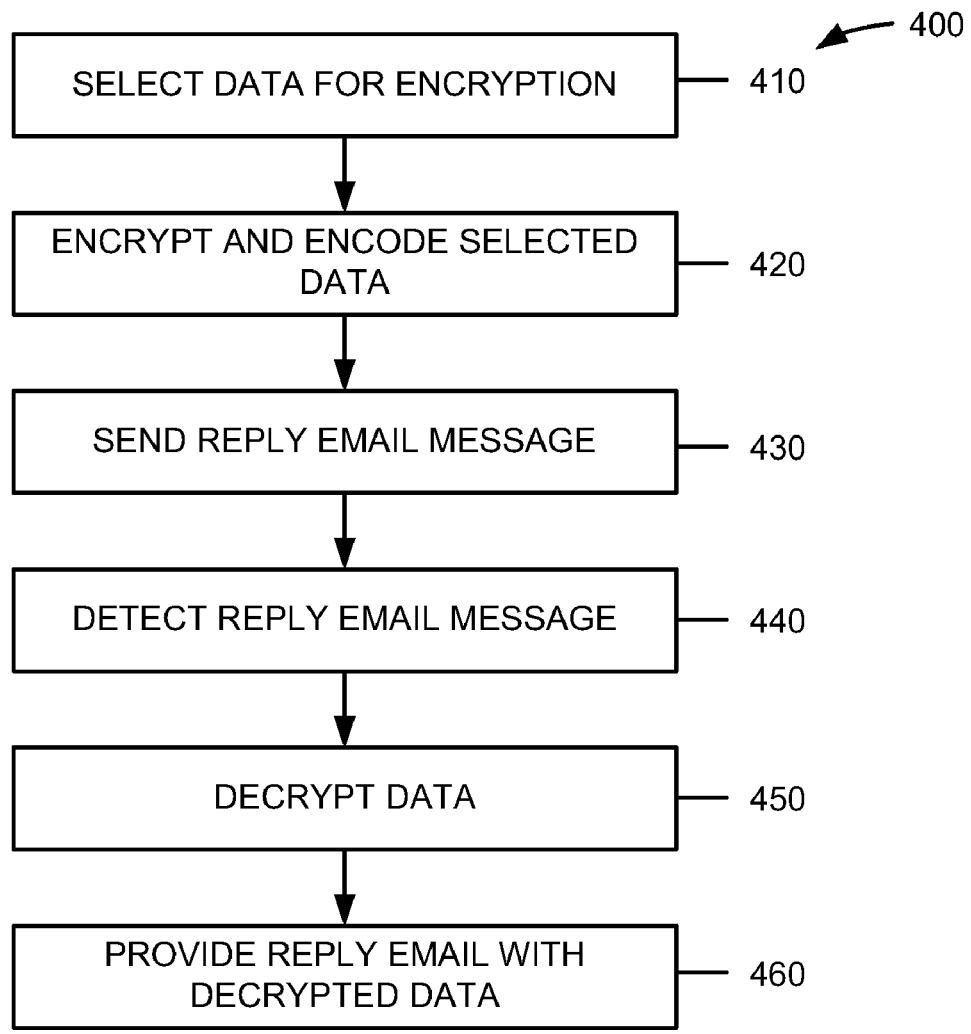
FIG. 5 illustrates an example of a flow chart of a methodology for securely transferring a reply email message in accordance with an aspect of the invention.

FIGS. 4 and 5 illustrate flow charts of methodologies in accordance with aspects of the invention. It is to be understood and appreciated that the illustrated actions, in other embodiments, may occur in different orders and/or concurrently with other actions. Moreover, not all illustrated features may be required to implement the methodologies.

FIG. 4 illustrates a flow chart of a methodology 200 for processing a secure email message in accordance with an aspect of the invention. At 210, a secure email message is generated and sent to a recipient from a sender. As an example, the email message can be marked by the sender of the message, the mark indicating that the sender desires the email message to be sent securely to the sender. At 220, the marked email message can be detected, for example by an encryption server. Upon detecting the encrypted marked email message, at 230, at least one unique cryptography key and a unique message ID can be generated for the email message. The at least one unique cryptography key and the unique message ID can be stored, for example, in a record of a database associated with the email message. At 240, at least some of the contents of the email message can be stripped from the email message and encrypted, such that the encrypted contents can only be decrypted with an cryptography key of the at least one unique cryptography key. At 250, the encrypted contents can be encoded into an executable file, and the corresponding unencrypted contents of the email message can be replaced with the executable file, which can be referred to as a decryption attachment. At 260, the email message can be sent to the recipient wherein the executable file is attached to the email message.

At 270, the decryption attachment is executed. Upon execution, at 280 a user (e.g., the recipient) can be authenticated by the decryption attachment and the encryption server. At 290, the encryption server can provide the decryption attachment with the cryptography key of the at least one unique cryptography key that can decrypt the contents of the email message. At 300, the contents of the email message are decrypted and provided to the recipient.

FIG. 5 illustrates a flow chart of a methodology 400 for processing a secure reply email message in accordance with an aspect of the invention. In the present example, the reply email message is implemented as a reply message generated by the recipient of the secure email message explained with respect to FIG. 4. At 410, data is selected by the recipient for encryption. At 420, the selected data is encrypted with the cryptography key and encoded into a file. As an example, upon encryption, the selected data can be encoded into the encryption attachment of the email message. At 430, the reply email message can be sent back to the sender of the email message, as a standard email message. At 440, the reply email message can be detected, for example by an encryption server. At 450, the encrypted selected data can be decrypted using a cryptography key of the at least one cryptography keys generated for the email message, as discussed with respect to FIG. 4. At 460, the reply email can be provided to the sender wherein the reply email message includes the selected data in decrypted form.

Figure 6:
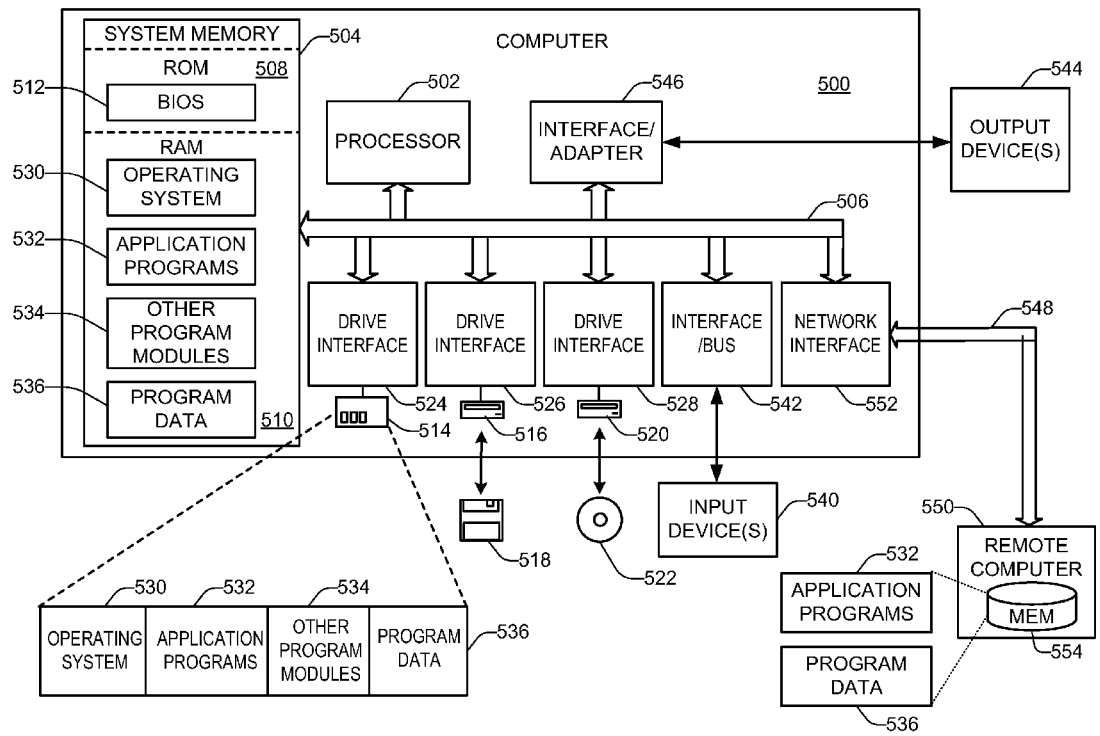
FIG. 6 illustrates a computer system that can be employed to implement systems and methods described herein, such as based on computer executable instructions running on the computer system.

FIG. 6 illustrates a computer system 500 that can be employed to implement systems and methods described herein, such as based on computer executable instructions running on the computer system. The computer system 500 can be implemented on one or more general purpose networked computer systems, embedded computer systems, routers, switches, server devices, client devices, various intermediate devices/nodes and/or stand alone computer systems. Additionally, the computer system 500 can be implemented as part of the security email system running computer executable instructions to perform a method as described herein.

The computer system 500 includes a processor 502 and a system memory 504. A system bus 506 couples various system components, including the system memory 504 to the processor 502. Dual microprocessors and other multi-processor architectures can also be utilized as the processor 502. The system bus 506 can be implemented as any of several types of bus structures, including a memory bus or memory controller, a peripheral bus, and a local bus using any of a variety of bus architectures. The system memory 504 includes read only memory (ROM) 508 and random access memory (RAM) 510. A basic input/output system (BIOS) 512 can reside in the ROM 508, generally containing the basic routines that help to transfer information between elements within the computer system 500, such as a reset or power-up.

The computer system 500 can include a hard disk drive 514, a magnetic disk drive 516, e.g., to read from or write to a removable disk 518, and an optical disk drive 520, e.g., for reading a CD-ROM or DVD disk 522 or to read from or write to other optical media. The hard disk drive 514, magnetic disk drive 516, and optical disk drive 520 are connected to the system bus 506 by a hard disk drive interface 524, a magnetic disk drive interface 526, and an optical drive interface 534, respectively. The drives and their associated computer-readable media provide nonvolatile storage of data, data structures, and computer-executable instructions for the computer system 500. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital video disks and the like.

A number of program modules may also be stored in one or more of the drives as well as in the RAM 510, including an operating system 530, one or more application programs 532, other program modules 534, and program data 536 such as the systems and methods as illustrated in FIGS. 1-5. For example, the computer system 500 can be employed to implement the sender or recipient workstations 102 and 124, the sender or recipient email servers 118 or 120, the encryption server 110 or the database 116 illustrated in FIG. 2.

A user may enter commands and information into the computer system 500 through user input device 540, such as a keyboard, a pointing device (e.g., a mouse). Other input devices may include a microphone, a joystick, a game pad, a scanner, a touch screen, or the like. These and other input devices are often connected to the processor 502 through a corresponding interface or bus 542 that is coupled to the system bus 506. Such input devices can alternatively be connected to the system bus 506 by other interfaces, such as a parallel port, a serial port or a universal serial bus (USB). One or more output device(s) 544, such as a visual display device or printer, can also be connected to the system bus 506 via an interface or adapter 546.

The computer system 500 may operate in a networked environment using logical connections 548 to one or more remote computers 550. The remote computer 548 may be a workstation, a computer system, a router, a peer device or other common network node, and typically includes many or all of the elements described relative to the computer system 500. The logical connections 548 can include a local area network (LAN) and a wide area network (WAN).

When used in a LAN networking environment, the computer system 500 can be connected to a local network through a network interface 552. When used in a WAN networking environment, the computer system 500 can include a modem (not shown), or can be connected to a communications server via a LAN. In a networked environment, application programs 532 and program data 536 depicted relative to the computer system 500, or portions thereof, may be stored in memory 554 of the remote computer 550.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A system for securely providing email, the system comprising:
    a workstation computer comprising:
        a memory for storing computer executable instructions; and
        a processor for accessing the memory and for executing computer executable instructions, the computer executable instructions comprising:
            an email client configured to process email messages, at least one email message having an executable decryption attachment that includes encrypted embedded content that can only be decrypted with a unique cryptography key, wherein the executable decryption attachment, when executed is configured to:
                establish a secure connection with an encryption server, receive the unique cryptography key from the encryption server and decrypt the embedded content;
                collaborate with the encryption server to authenticate a recipient of the email message;
                provide an interface to the recipient that allows the recipient to select data for encryption, wherein the executable decryption attachment encrypts the selected data with the unique cryptography key to provide encrypted selected data; and
                encode the encrypted selected data into the executable decryption attachment.

2. The system of claim 1, wherein the unique cryptography key comprises a symmetric cryptography key.

3. The system of claim 1, wherein the unique cryptography key comprises an asymmetric cryptography key of a cryptography key pair.

4. A non-transitory computer readable medium having computer executable instructions for performing a method for securely providing email messages, the method comprising:
    stripping at least a portion of the contents of an email message marked for encryption;
    encrypting the stripped contents to form encrypted contents that can only be decrypted with a unique cryptography key;
    generating an executable file that includes the encrypted contents and a unique message identification;
    replacing the stripped contents of the email message with the executable file; and
    authenticating a recipient of the email message and providing the unique cryptography key to the recipient in response to a request initiated by an execution of the executable file by the recipient of the email message;
    wherein the executable file is configured to perform a method upon execution, the method comprising:
        prompting the recipient of the email message for a password;
        receiving the unique cryptography key;
        decrypting the encrypted contents employing the unique cryptography key;
        providing the decrypted contents to a recipient of the email message;
        encrypting data selected by the recipient of the email message using the unique cryptography key to provide encrypted selected data; and
        encoding the encrypted selected data into the executable file.

5. The non-transitory computer readable medium of claim 4, the method further comprising detecting the email message marked for encryption.

6. The non-transitory computer readable medium of claim 5, the method further comprising generating a unique message identification for the email message.

7. The non-transitory computer readable medium of claim 4, wherein the unique cryptography key comprises an asymmetric cryptography key of an encryption key pair.

8. The non-transitory computer readable medium of claim 4, wherein the unique cryptography key comprises a symmetric cryptography key.

9. A computer implemented method for securely providing email, the method comprising:
    receiving an email message that includes an executable file with encrypted content that can only be decrypted with a unique cryptography key; and
    executing the executable file, the executable file, when executed:
        prompting a recipient of the email message for a password;
        receiving the unique cryptography key over a network;
        decrypting the encrypted content with the unique cryptography key;
        encrypting data selected by the recipient of the email message using the unique cryptography key to provide encrypted selected data;
        providing the decrypted content to the recipient of the email message;
        encoding the encrypted selected data into the executable file; and
        providing a reply email message to a sender of the email message that includes the executable file.

10. The computer implemented method of claim 9, wherein executing the executable file further comprises providing the decrypted content to the recipient of the email message.

11. The computer implemented method of claim 9, further comprising:
    detecting the reply email message;
    decrypting the encrypted selected data; and
    providing the reply email message to the sender of the email message with decrypted selected data.

* * * * *